Nov. 8, 1927. 1,648,435
S. E. WINDER ET AL
FLOW FEED FOR GLASS MACHINES
Filed July 23, 1924 6 Sheets-Sheet 1

INVENTORS:
Samuel E. Winder
Henry C. Daubenspeck
By E. J. Andrews
Atty.

Nov. 8, 1927.  
S. E. WINDER ET AL  
1,648,435  
FLOW FEED FOR GLASS MACHINES  
Filed July 23, 1924  
6 Sheets-Sheet 3

INVENTORS:  
Samuel E. Winder  
Henry C. Daubenspeck  
By E. J. Andrews  
Atty.

Nov. 8, 1927.

S. E. WINDER ET AL 1,648,435

FLOW FEED FOR GLASS MACHINES

Filed July 23, 1924

6 Sheets-Sheet 4

INVENTORS:
Samuel E. Winder
Henry C. Daubenspeck
By E. J. Andrews
Atty.

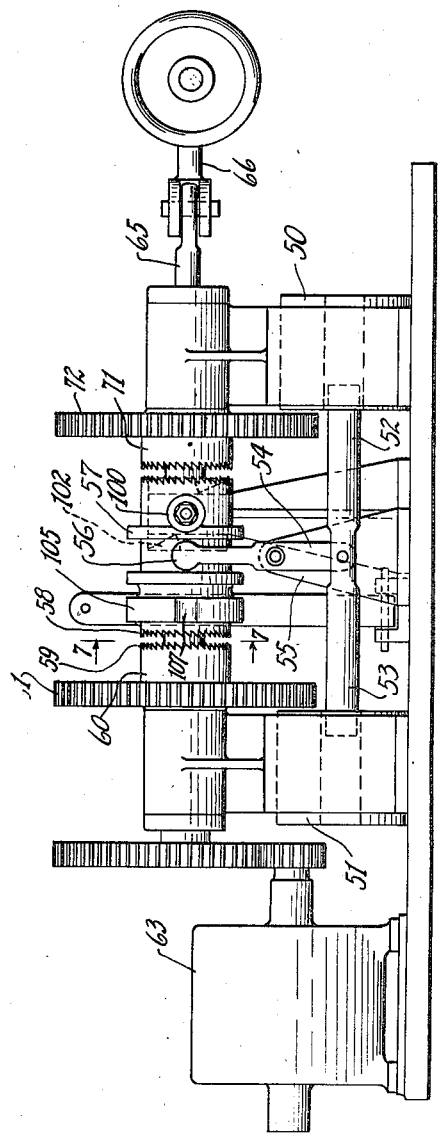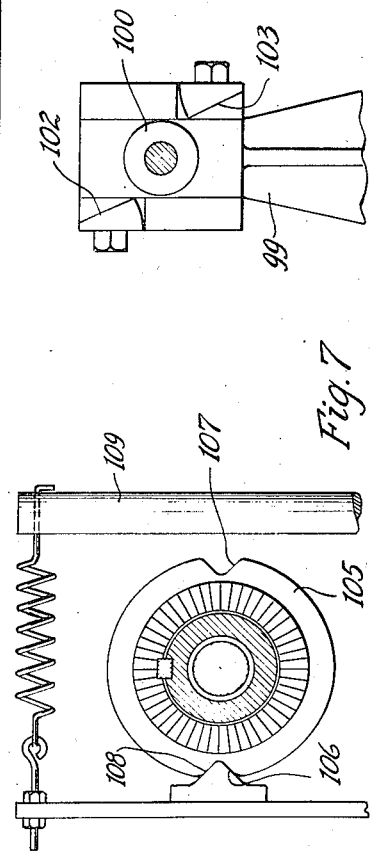

Patented Nov. 8, 1927.

1,648,435

UNITED STATES PATENT OFFICE.

SAMUEL E. WINDER, OF CHICAGO, ILLINOIS, AND HENRY C. DAUBENSPECK, OF MASSILLON, OHIO.

FLOW FEED FOR GLASS MACHINES.

Application filed July 23, 1924. Serial No. 727,624.

This invention relates to glass making machinery and particularly to means for properly feeding the molten glass to machines for the purpose of forming jars, tumblers, bottles, and the like. One object of the invention is to provide means for keeping the temperature of the molten glass most suitable for the best results until the glass has been delivered to the mold for operation thereon. Another object is to provide suitable shearing means for separating the glass, as it flows from the glass tank, into masses, ordinarily called parisons, of suitable weights for making the particular articles. Another object of the invention is to provide improved means for maintaining constant the rate of flow of the molten glass from the tank so as to keep uniform the weight of the parisons. Other objects of the invention will be apparent from a consideration of the accompanying drawings and the following description thereof.

Figure 1:
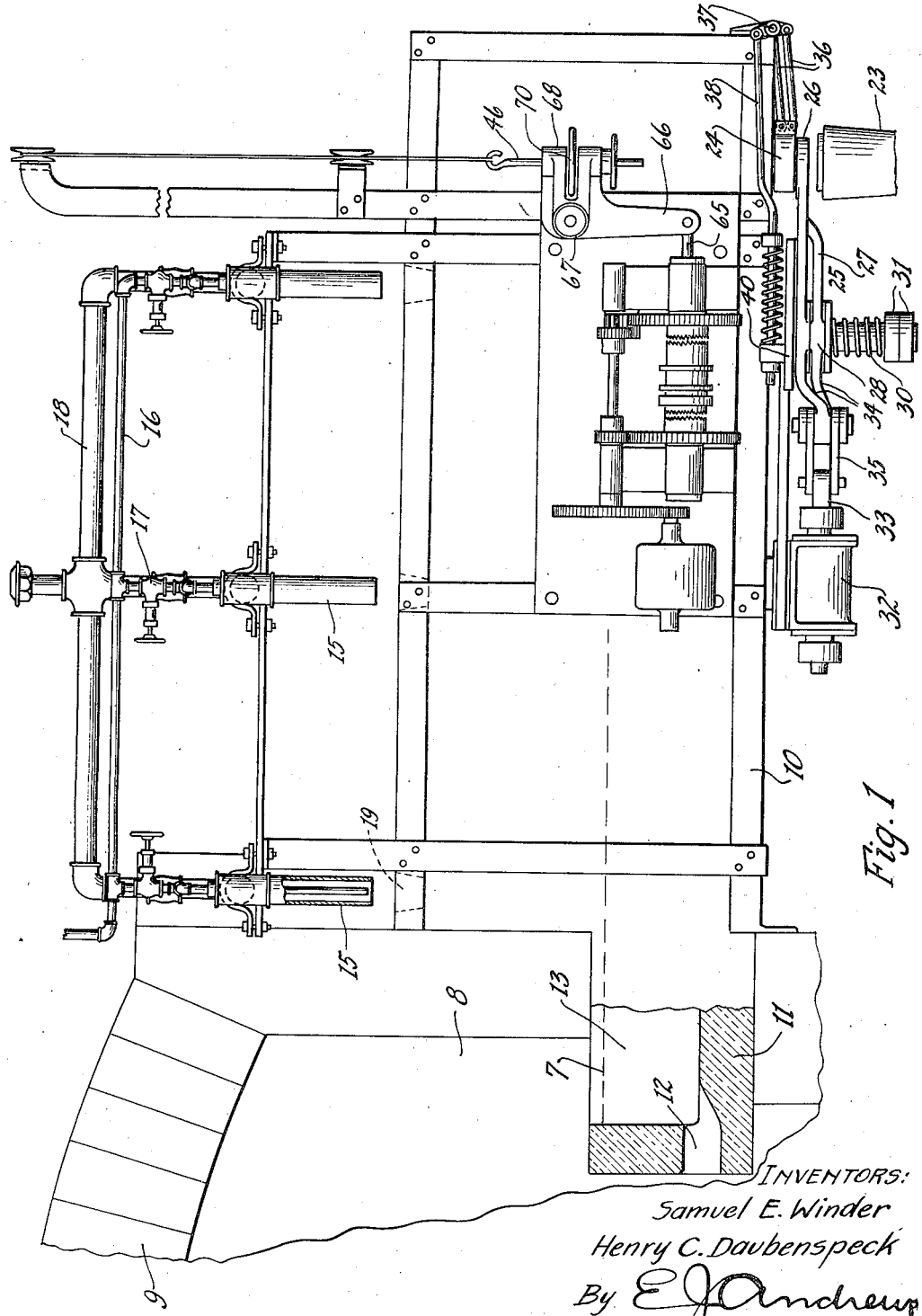
Figure 2:
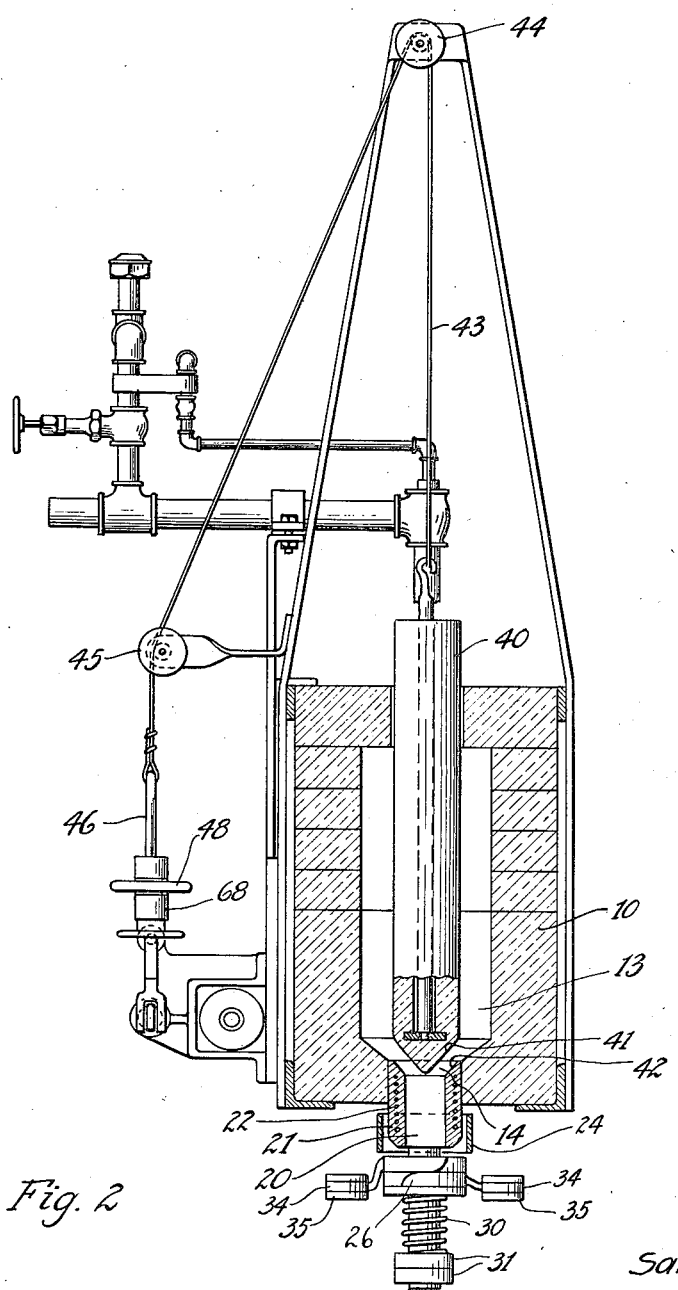
Figure 3:
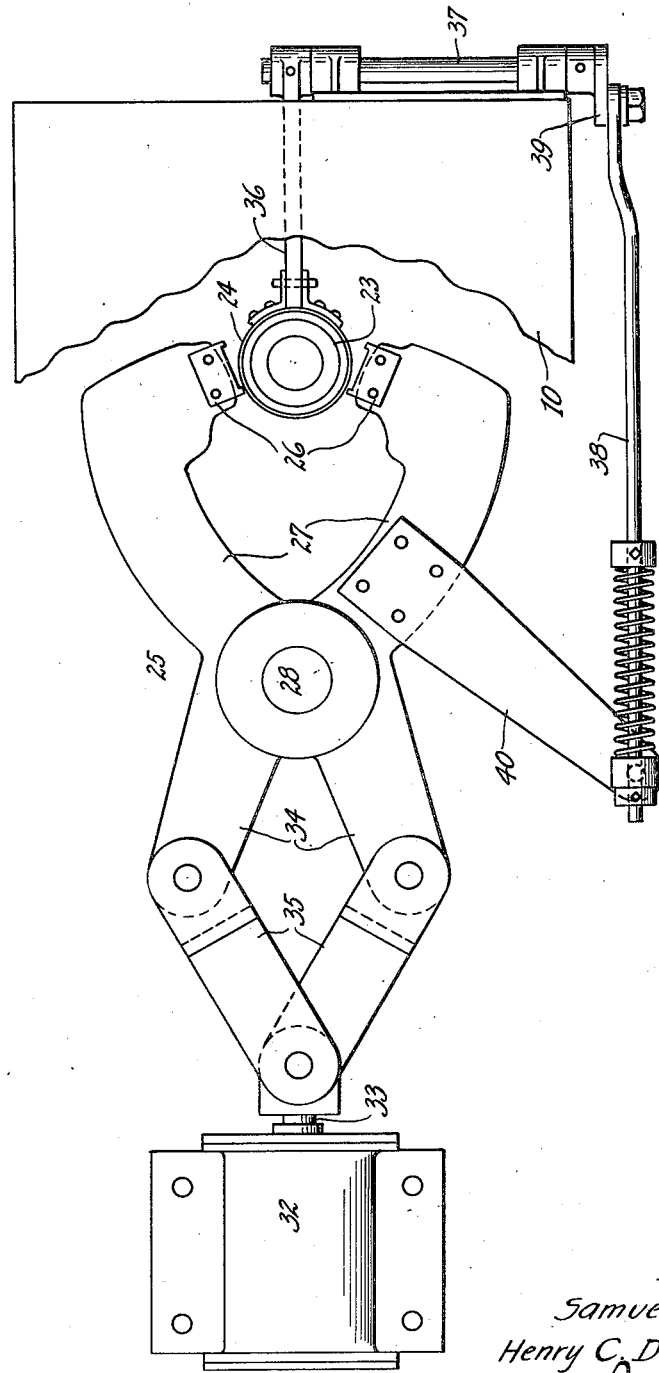
Figure 4:
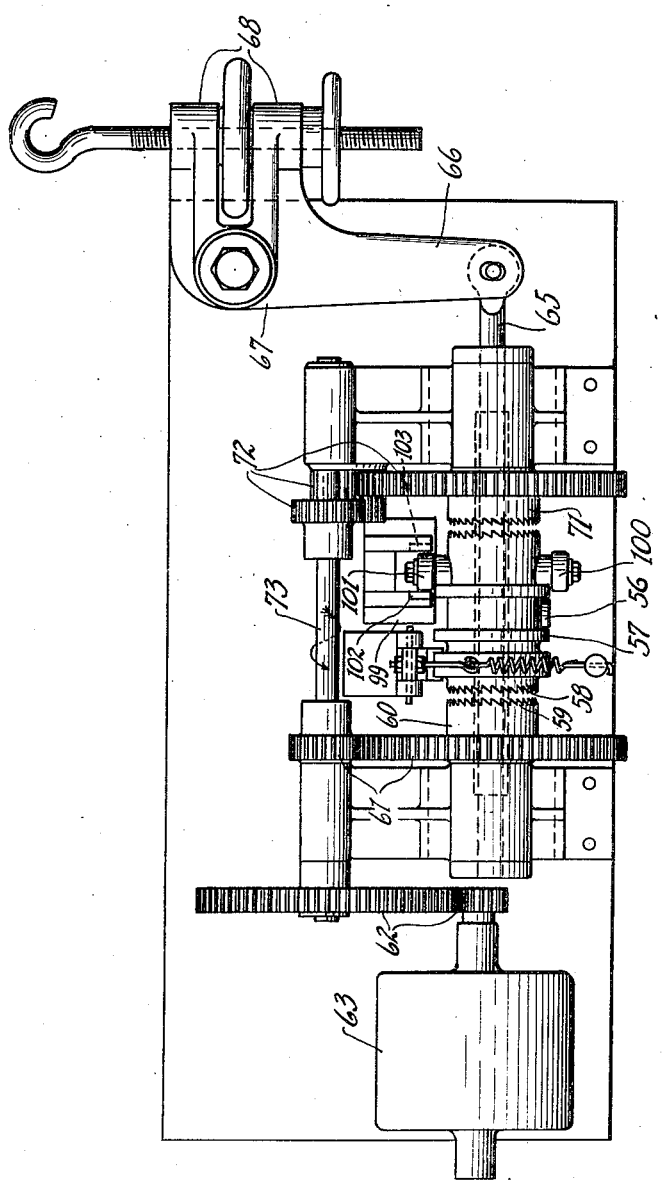
Figure 5:
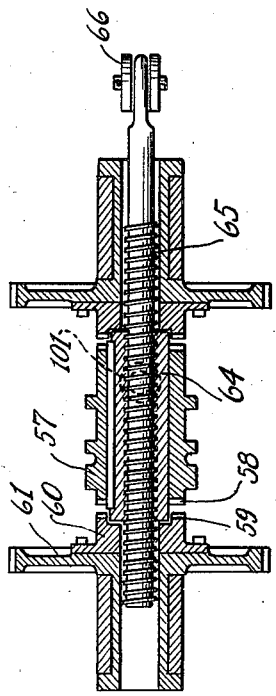
Figure 9:
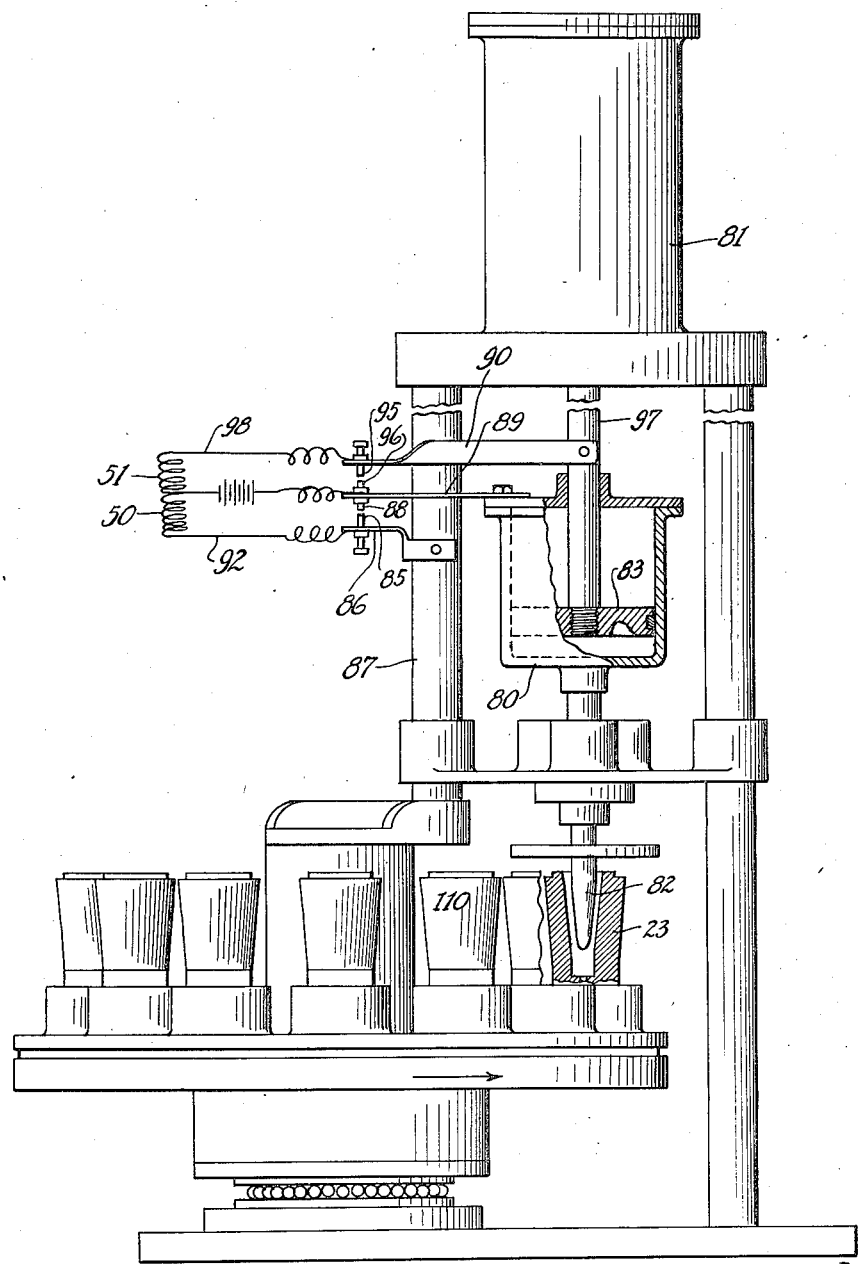

Of the drawings, Fig. 1 is an elevation of a portion of the tank in which the molten glass is formed and of the various devices and mechanism used in properly controlling the temperature and rate of flow of the glass as it is being delivered to the molds; Fig. 2 is a front elevation of the construction illustrated by Fig. 1; Fig. 3 is a plan view of the shearing apparatus and a temperature controlling device fixed thereto; Fig. 4 is an elevation of the flow controller; Fig. 5 is a central sectional view of a portion of the flow controller; Fig. 6 is a plan view of the flow controller; Fig. 7 is a section along the line 7—7 of Fig. 6; Fig. 8 is a detail view of the stop mechanism of the controller; and Fig. 9 is an elevation of a glass molding machine with controller operating means associated therewith.

Any suitable means may be used for producing the molten glass and it may be formed in any suitable tank. The molten glass is formed in the chamber 8 of the tank 9. In the drawings the tank is not shown in full, but the apparatus for delivering the molten glass from the tank to the molds is illustrated in Figs. 1 and 2, and it comprises a casing 10 made of suitable heat resisting material and having a base 11. The molten glass flows from the tank chamber 8 through an inlet 12 into a chamber 13 of the casing, and is maintained, by any suitable means, substantially uniform in depth and preferably so that the upper surface is about at the dotted line 7. As the glass flows through the chamber 13 to the outlet 14 thereof the temperature of the glass is maintained constant by suitable means. We prefer for the purpose the burners 15 which are supplied with gas or oil through the pipes 16 controlled by the valves 17, and also with air through the pipes 18. By means of these burners flames are projected downwardly into openings 19 in the wall of the casing. In this manner the temperature of the molten glass is maintained constant and proper for the most effective manipulation of the glass.

The glass flows through the outlet 14 in the chamber 13 into an opening 20 in the outlet cylinder 21. In order to insure the proper temperature as it flows through the cylinder, suitable means may be provided, such as the electric resistance wires 22 embedded in the walls of the cylinder and through which a current is passed in any ordinary manner and suitably controlled in any well-known manner, not shown. From the outlet 21 the molten glass flows into the molds 23 in which the parison is to be molded as desired, the temperature of the glass being maintained properly as it passes from the outlet to the mold by means of an insulation collar 24, which as hereinafter described, is positioned between the outlet and the mold as the glass flows and while the shears are not being operated. In these various ways the temperature is maintained proper until the parisons are delivered into the molds.

Suitable shearing means may be provided for cutting off the parisons from the flowing glass. We prefer for the purpose the shears 25, Fig. 3, which have blades 26 fixed to arms 27 pivoted at 28 to the casing 10. In order to provide suitable pressure between the two arms, a spring 30 is provided, the compression of which may be adjusted by the nuts 31. The shears are operated by any suitable fluid under pressure, which is passed, in any well-known manner, into the cylinder 32. This operates at the proper time a piston having a stem 33 to which the ends 34 of the arms of the shears are pivoted by means of links 35. As is obvious when the piston stem 33 is forced outwardly the blades of the shears will be closed to cut the flowing glass; the blades will then be separated as the piston stem is forced inwardly in a manner well understood.

In order to properly operate the insulation cylinder 24, the cylinder is supported by parallel links 36. One end of each link is pivoted to the collar, and the other end of one link is pivoted to the frame and the other end of the other link is fixed to the rod 37 which is journaled in a bracket fixed to the casing. A rod 38 is pivoted to an arm 39 fixed to the rod 37, and this rod is operated by an arm 40 fixed to one arm 27 as the shears are operated. As the arm of the shear is operated to close the shears the link 38 will be carried forward and the insulation collar 24 will be raised out of the way of the shears. As the shears are being opened the link 38 will be carried rearwardly and the collar will be lowered to its normal position between the outlet 21 and the mold 23. So that, at all times when the shears are not operating, the flowing glass will be protected by the collar from drafts and largely from the radiation of heat. If desired, means may be used so that the temperature of the collar may be maintained as high as may be necessary in order to supply as much heat to the flowing glass as is lost by radiation or otherwise.

In the use of glass molding machinery, we have found it to be impracticable by the ordinary methods to maintain uniform the rate of flow of the glass from the outlet of the glass chamber. We therefore provide means for returning to normal the rate of flow if it becomes too great or too little for the best results. Over the outlet 14 is suspended a plug 40 having at its lower end a valve 41 adapted to coact with the seat 42 of the outlet and thereby to close the outlet. But in operation the valve is suspended above the seat and the position of the valve determines the rate of flow. In order to vary the valve opening the plug is ordinary suspended by means of a flexible wire or cord 43 passing over a pulley 44 and guided by a pulley 45 and connected to a rod 46. The rod 46 is adjustably supported by means of a supported wheel 48 into which the rod 46 is threaded. By these means the opening of the valve may be adjusted manually by rotating the wheel 48 with reference to the rod 46. However, we prefer to provide automatic means for making this adjustment so as to relieve the workman and also to more perfectly adjust the flow to the needs.

The principle of our automobile adjustment of the flow of glass to the molds is based upon the fact that if the flow is too great the mold plunger will not move downwardly into the mold to the normal point, or if the flow is too little the plunger will move slightly below the normal point. And in case of such abnormal operation of the plunger, we provide means for closing or opening slightly the feed valve opening according to the needs, and for this purpose provide the following described apparatus.

Suitably associated with the molding plunger of the machine, as hereinafter described, are electric contacts which close and open electric circuits adapted to energize the coils of the solenoids 50 and 51, Fig. 6, and associated with these solenoids are magnetic cores 52 and 53. If the rate of flow of the glass is too great one of these coils is energized and the cores are pulled in the direction of that coil; if the flow is too little the other coil is energized and the cores are pulled in the direction of that coil; and when the flow is proper neither coil will be energized and the cores will assume the neutral position indicated. Pivotally associated with the cores is a lever 54 pivoted to a bracket 55. On the upper end of the lever is fixed a fork 56 which coacts with the two-faced clutch member 57. As the cores are forced to the right the teeth 58 of the clutch member will coact with teeth 59 fixed to a collar 60, and the clutch member 57 then will be rotated by means of gear wheels 61 and 62 which are continuously operated by a motor 63. The clutch member 57 is slidably but non-rotatably mounted on a sleeve 64 into which is threaded the slidable but non-rotatable rod 65. So that, as the clutch member 57 coacts with the collar 60 the sleeve 64 will be rotated and the rod 65 will be shifted in one direction or the other depending upon the direction of rotation of the motor shaft. The rod 65 is pivoted to an arm 66 of a lever which has its fulcrum 67 pivoted to the casing or otherwise rigidly supported. The other end of the lever comprises a fork 68 through which passes the rod 46 and on which is threaded the wheel 70. So that, as the rod 65 moves inwardly or outwardly, the lever 66 will be operated so as to move upwardly or downwardly the rod 46 and hence the valve 41. When the solenoid cores are moved to the left the clutch member 57 will coact with the collar 71 and, by means of the three gears 72, the rod 73, the gears 62, and the motor 63, the rod 65 will be moved in the direction opposite to its motion when the clutch member 57 is coacting with the collar 60. As a consequence the movement of the valve will be opposite to that of its former movement. In practice the rotation of the shaft 73 is such that when the left-hand clutch members coact, the rod 65 will be shifted to the right and the valve opening will be slightly diminished; and when the right-hand clutch members coact the valve opening will be slightly increased.

Any suitable mechanism may be used for adjusting the opening of the valve according to the needs; but we prefer the mechanism hereinabove described and prefer to control the solenoids by means of electric circuits which are opened and closed by the plunger mechanism when the plunger is not forced into the mold to the normal depth. It is common in the manufacture of bottles, jars, and the like, to first mold the parison in a mold, forming it into a blank having a central bore punched therein, and then to transfer the blank to a blowing machine and blow it into the desired article. When the articles are so made it is common for the plunger to be forced into the parison only to about three fourths of its length so that there is a thickness of about an inch and a half of glass in the mold below the lower end of the plunger. As a consequence a rather immaterial difference in the amount of glass in the parison will materially affect the distance the plunger will be forced downwardly.

In this connection it will be understood that, in practice, cushioning means are used to operate the plunger so that when a certain pressure is reached the plunger will stop even though the operating means still continues to move downwardly. This may be arrived at by the use of the plunger mechanism shown in Fig. 9 in which a cylinder 80 is mounted between the driving mechanism 81, which, in this instance, is a compression cylinder and piston, and the plunger 82; the cylinder 80 being filled with compressed air which normally holds the piston 83 in the upper end of the cylinder but allows the piston to move downwardly against the fluid pressure of the cylinder 80 when the resistance to the downward movement of the plunger exceeds a certain amount. Thus, if the amount of glass in the mold exceeds the normal amount the plunger will not be forced downwardly to the normal point, or if there is a deficiency of glass in the mold the plunger will be forced downwardly beyond the normal point. We have shown diagrammatically in Fig. 9 the electric means for controlling the flow of glass.

In order to properly control the solenoids we mount an electric contact 85 on a resilient arm 86 fixed to the support 87 of the cylinder 81, and a contact piece 88 is mounted in an arm 89 fixed to the cylinder 80. If there is a deficiency of glass in the mold 23 the plunger 82 will be forced therein until the contacts 85 and 88 come together and the electric circuit 92 through the coil of the solenoid 51 will be closed and this will operate the rod 65 so as to open slightly more the opening of the valve 41. In order to provide for an excess of glass in the mold we provide contacts 95 and 96, contact 95 being fixed by means of the resilient arm 90, to the piston rod 97, and the contact 96 being fixed to the cylinder 80. In case of an excess of glass the plunger will be stopped before reaching the normal limit and the piston stem 97 will be forced downwardly beyond the normal, closing the contacts 95 and 96 and thus closing the circuit 98 and by means of the solenoid 50 operating the rod 65 to close slightly the feed valve.

In practice it becomes desirable to provide means for stopping the clutch members after a definite amount of rotation so as to definitely determine the amount of valve adjustment. We therefore provide means for mechanically forcing apart the clutch members irrespective of the solenoids, although normally the solenoid circuit is opened before this becomes necessary. These means comprise rollers 100 and 101, fixed on opposite sides of the clutch member 57, and adapted to coact with cams 102 and 103 fixed to a bracket 99. The cam 102 is positioned in the path of motion of the rollers when the clutch member is toward the left, and the cam 103 is positioned in the path of the motion of the rollers when the clutch member is toward the right. When the clutch member is in the neutral position the rollers are not affected by the cams. The cams are so located that the clutch member 57 will rotate through 180° before being operated by the cams. Hence, when the circuit of either solenoid is closed the clutch will become effective and will rotate the clutch member through 180° and it will then be forced back to the neutral position by one cam or the other.

However, it also becomes desirable to have definite means for stopping the rotation of the clutch member at the proper position, and this we provide for by means of an annular flange 105, fixed to the clutch member 57, the flange having notches 106 and 107 therein. Adapted to coact with these notches is a finger 108, resiliently held, by means of a post 109, against the flange, and normally being positioned in one of the notches. The shapes of the notches and the finger are such that the finger will readily be forced out of the notch when the clutch member 57 is rotated. Hence, in practice, upon energizing one of the solenoids the clutch member 57 will be shifted to coact with one of the rotating clutch members and will be rotated until it is shifted back to normal position by one of the cams 102 or 103, and the arrangement of the parts is such that this will occur just as the finger 108 is passing into the notch 106 or 107 and further rotation of the clutch will thus be prevented.

Also in practice it is customary to position the plunger over the second mold from the one which is receiving the molten glass. Thus the plunger is operating in the mold 23 when the glass is being fed into the mold 110, as it is desirable to allow some time for the glass to settle in the mold. As a consequence an adjustment of the valve, by means of the plunger, will not affect the amount of glass in the next parison to be operated on, which is in the adjacent mold. Hence it is not desirable to have the next operation of the plunger also affect the position of the valve. In other words, there should be but one adjustment of the valve for two operations of the plunger. Hence, we arrange the various parts so as to produce one-half of a rotation of the clutch member 57 during two operations of the plunger. As a consequence, while one plunger operation affects the valve the next plunger operation will have no effect because at that time the clutch member 57 is still under the influence of the last operation of the plunger. This is not so, however, if one parison is too large and the next one is too small, or the reverse. In such a case one solenoid would become effective with the first operation and the clutch member 57 would be reversed by the second operation. So that if by chance there should be a temporary excess of glass followed by a deficiency, the proper control of the valve would follow.

We have not thought it necessary to describe herein many of the details of the glass molding machine, as they are not material to this application. But in the copending application of Samuel E. Winder, Serial No. 718,206, filed June 6, 1924, is fully illustrated and described our preferred form of glass molding machine, and reference may be had thereto for various details not shown herein.

We claim as our invention:

1. In glass forming mechanism a mold, means for delivering molten glass into said mold, means for protecting the glass from heat loss as it flows from said delivering means into said mold, said protecting means comprising a collar adapted to encircle said flowing glass, and means for raising and lowering said collar.

2. In glass forming mechanism, a mold, means for passing glass into said mold, means for cutting said glass as it passes towards said mold, means for preventing loss of heat from said glass as it flows towards said mold, said means comprising a collar adapted to encircle said stream of glass, and means for moving the collar from its normal position as said glass is being cut.

3. In glass forming mechanism a mold, means for passing glass into said mold, means for cutting said glass as it passes towards said mold, means for preventing loss of heat from said glass as it flows towards said mold, said means comprising a collar adapted to encircle said stream of glass, and means for moving the collar from its normal position as said glass is being cut, said latter means comprising an arm fixed to said shears, and mechanism connecting said arm and said collar whereby as said shears are operated said collar is raised or lowered.

4. The combination of glass feeding mechanism comprising an outlet and a valve for controlling the opening of said outlet, a mold for receiving glass flowing from said outlet, and a plunger for passing into said mold to mold said glass, mechanism for controlling said valve, said controlling mechanism comprising an electric motor having a circuit, and means for closing said circuit when said plunger passes into said mold beyond its normal position.

5. Glass molding mechanism comprising a mold, means for feeding glass into said mold, a plunger for said mold, means for reciprocating said plunger comprising a cylinder and a piston, and means for controlling the rate of flow of said glass into said mold depending upon the distance said plunger moves into said mold in its reciprocations, said controlling means comprising a fixed electric contact, and an electric contact fixed to said reciprocating means, said two contacts arranged to come together when said plunger moves into said mold beyond its normal distance.

6. Glass molding mechanism comprising a mold, means for feeding glass to said mold, a plunger for molding the glass in said mold, means for reciprocating said plunger, said means comprising a piston and a cylinder adapted to hold a compressed fluid, and means for adjusting the rate of flow of the glass to said mold, said means comprising an electric contact fixed to said cylinder, and a second electric contact rigidly associated with said piston, said contacts being positioned so that when said piston moves into said cylinder a material distance said contacts will come together.

7. In a glass forming mechanism means for feeding molten glass and means for controlling the rate of flow of said glass, said means comprising a valve, a sleeve, a rod operatively connected with said valve and threaded into said sleeve, a clutch member slidably but not rotatably mounted on said sleeve, means for rotating said member in one direction when it is slid on said sleeve in one direction, means for rotating said member in the opposite direction when it is slid in the opposite direction, and means, depending upon the rate of flow of said glass, for sliding said member on said rod.

8. In a glass forming mechanism means for feeding molten glass and means for controlling the rate of flow of said glass, said means comprising a valve, a sleeve, a rod operatively connected with said valve and threaded into said sleeve, a clutch member slidably but not rotatably mounted on said sleeve, means for rotating said member in one direction when it is slid on said sleeve in one direction, means for rotating said member in the opposite direction when it is slid in the opposite direction, means, depending upon the rate of flow of said glass, for sliding said member on said rod, and means limiting the rotation of said sleeve to 180°.

In testimony whereof we hereunto set our hands.

SAMUEL E. WINDER.
HENRY C. DAUBENSPECK.